United States Patent [19]

Evans

[11] 4,062,556
[45] Dec. 13, 1977

[54] COLLAPSIBLE CART

[75] Inventor: Donald H. Evans, Swansea, Wales

[73] Assignee: Apex Packaging Co. (Swansea) Limited, Swansea, Wales

[21] Appl. No.: 672,165

[22] Filed: Mar. 31, 1976

Related U.S. Application Data

[63] Continuation-in-part of Ser. No. 574,635, May 5, 1975, abandoned.

[51] Int. Cl.² .............................................. B62D 53/06
[52] U.S. Cl. .................................................... 280/79.2
[58] Field of Search .............. 280/79.2, 79.1 R, 79.3, 280/651; 220/4 F; 229/41 B, 41 R

[56] References Cited

U.S. PATENT DOCUMENTS

| 571,691 | 11/1896 | Schmidt | 229/41 R |
| 831,415 | 9/1906 | Carnahan | 229/41 R |
| 2,152,217 | 3/1939 | Shaw | 280/79.2 |

Primary Examiner—Robert R. Song
Attorney, Agent, or Firm—Brady, O'Boyle & Gates

[57] ABSTRACT

A collapsible load handling trolley comprising a box-like receptacle formed by a sleeve and base of corrugated fibreboard, the sleeve being formed with creases which delimit four wall portions and which render the sleeve capable of being folded flat and the base being dimensioned to fit snugly within the sleeve, a frame for supporting the base, a set of ground engaging castors mounted to depend from the frame, and means for releasably securing the sleeve to the frame.

2 Claims, 3 Drawing Figures

COLLAPSIBLE CART

This application is a Continuation-In-Part of my co-pending application Ser. No. 574,635, filed May 5 1975, now abandoned.

This invention relates to load handling trolleys for storing or transporting goods.

For such purposes, trolleys have been used of which the base and the side and end walls are of steel, often steel wire mesh, or glass fibre reinforced plastics. Such trolleys are often heavy and dificult to manoeuver, and are inevitably expensive to produce.

It is known from U.S. Pat. No. 2,152,217 (Shaw) to provide a box hand truck of the same general kind as that which is the subject of the present invention, but this prior art arrangement is essentially a heavy steel structure which is incapable of ready disassembly into components occupying a minimum of space.

It is an object of the present invention to provide a load handling trolley which is lighter and therefore more manoeuvrable than the afore-mentioned conventional trolleys, and which is also less expensive to produce. A further important object of the invention is to provide a load handling trolley which is readily collapsible for ease of storage and the like.

Accordingly, the invention provides a collapsible load handling trolley comprising a box-like receptacle formed by a sleeve and base of corrugated fibreboard, the sleeve being formed with creases which delimit four wall portions and which render the sleeve capable of being folded flat and the base being dimensioned to fit snugly within the sleeve, a frame for supporting the base, a set of ground engaging castors mounted to depend from the frame, and means for releasably securing the sleeve to the frame.

The frame is preferably of timber, so that the fibreboard base can be nailed thereto. For this purpose aluminum flanged nails, such as those supplied to Triwall Corporation, are particularly suitable, since the head of each nail can be driven below the surface of the fibreboard and yet not penetrate through the board.

The corrugated fibreboard may be single, double or triple fluted, depending on the robustness required of the trolleys in use. Triple fluted corrugated fibreboard is preferred, since it is stronger. Such triple fluted corrugated fibreboard may be that sold by Triwall Corporation and known as "Tri-wall Pak". The fibreboard may be coated or impregnated with a hardening or waterproofing material, for example if the trolley is to be used in humid conditions. A curable synthetic resin is an example of a suitable hardening material.

In order to enable the invention to be more readily understood, reference will now be made to the accompanying drawings, which illustrate diagrammatically and by way of example an embodiment thereof, and in which.

Figure 1:
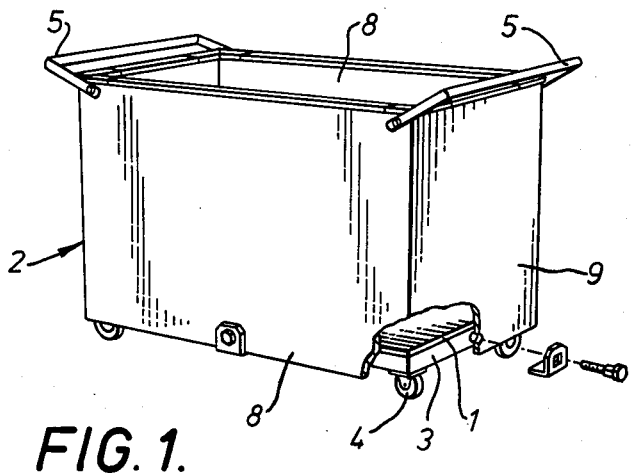
FIG. 1 is a perspective view partly broken away of a collapsable load handling trolley.
Figure 2:
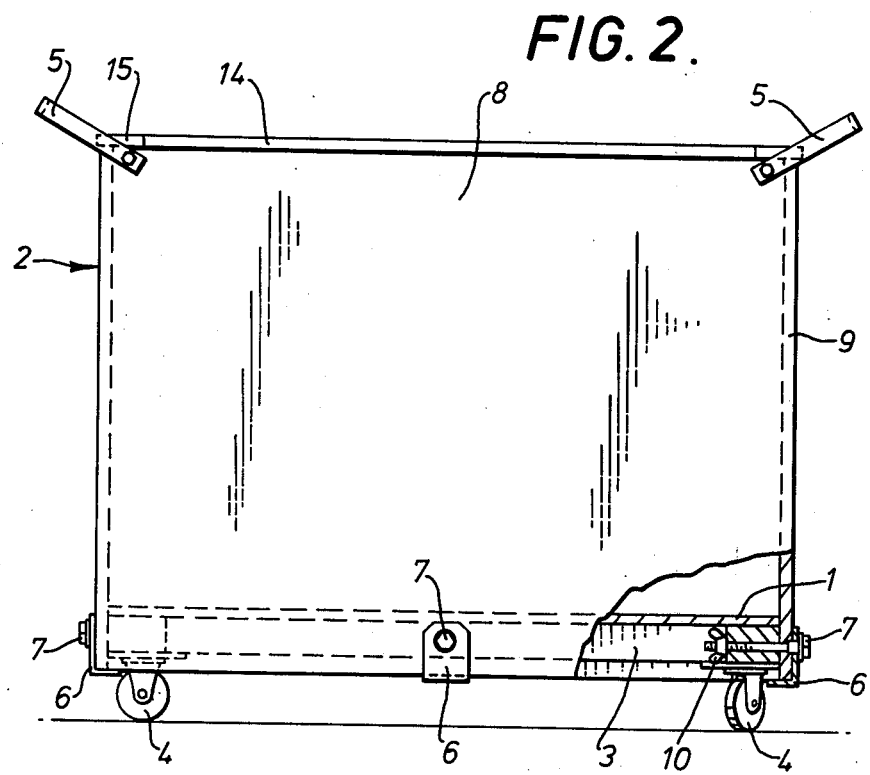
FIG. 2 is a side view of the trolley shown in FIG. 1.
Figure 3:
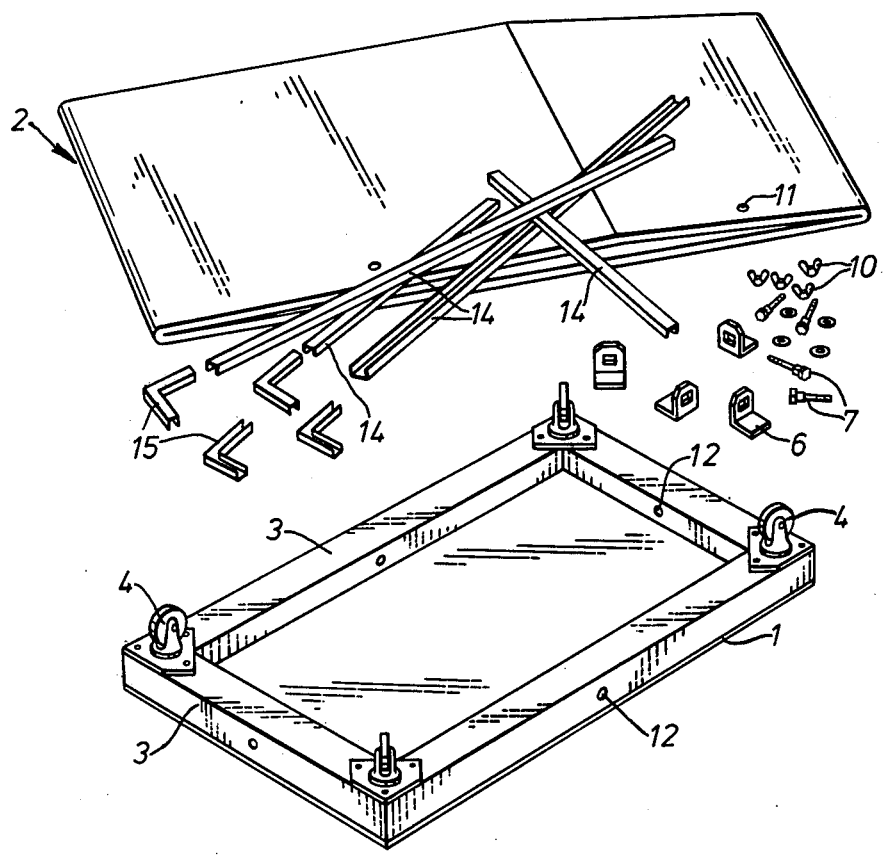
FIG. 3 is a perspective view of the trolley shown in FIGS. 1 and 2, but broken down into its component parts.

Referring to the drawings, a collapsible load handling trolley comprises an open-topped box-like storage receptacle formed by a rectangular base 1 and pairs of side and end walls 8 and 9 respectively of corrugated fibreboard which walls together constitute an upstanding rectangular sleeve generally designated by the reference numeral 2. The marginal portion of the base 1 is supported on a rectangular timber frame 3 and is secured thereto by suitable means, e.g. nails. Castors 4 depend from the corners of the frame 3 and are secured thereto, e.g. by screws.

The sleeve 2 is releasably secured to the frame 3 by means of coach bolts 7 carrying load spreading members 6 which are L-shaped in cross-section so as to engage the sides and the lower edge of the sleeve, the bolts passing through bores 11 in the sleeve and corresponding bores 12 in the frame and being secured in position by wing-nuts 10. The upper edge of the sleeve is terminated by straight channel section members 14 which are resiliently engaged within the sleeve, the corners of the upper edge of the sleeve being provided with snap-on corner pieces 15, also of the channel section. The members 14 may be aluminum extrusions and the members 15 may be of plastics.

The trolley is fitted with metal handles 5, which are bolted to the sleeve. The handles may alternatively be of rope or other material, or may be cut-out of fibreboard.

An exemplary method of manufacturing the trolley described above will now be described:

A sleeve of suitable dimensions is prepared from a strip of fibreboard by transverse bending or creasing to form a rectangular configuration and stitching or otherwise securing the ends of the strip together. A rectangular base of fibreboard dimensioned to fit snugly within the sleeve is nailed to the rectangular timber frame and castors are screwed to the corners of the frame either before or after the base is nailed thereto.

The sleeve is releasably secured to the frame by means of the coach bolts to form a rigid open-topped box-like wheeled receptacle, which can be readily disassembled by removing the coach bolts whereupon the sleeve can be folded flat to occupy the minimum of space.

A trolley manufactured as described above is sufficiently cheap for the corrugated fibreboard sleeve to be regarded as expendable and thrown away when damaged. The base, frame and attached castors can of course be reused with a new sleeve.

I claim:

1. A collapsible load handling trolley comprising a box-like receptacle formed by a sleeve and base of corrugated fibreboard, the sleeve being formed with creases which delimit four wall portions and which render the sleeve capable of being folded flat and the base being dimensioned to fit snugly within the sleeve, a frame for supporting the base and to which the base is secured, the arrangement being such that the frame defines a peripheral flange which is overlaid by a lower portion of the sleeve, a set of ground engaging castors mounted to depend from the frame, and means for releasably securing the sleeve to the frame at said flange and said lower portion of the sleeve, the securing means comprising bolts passing through apertures formed in the frame and the sleeve, load spreading members arranged on the bolts and shaped to engage the lower portions of the walls of the sleeve and the lower edge of the sleeve, and wing nuts on the bolts.

2. A collapsible load handling trolley comprising a box-like receptacle formed by a sleeve and base of corrugated fiberboard, the sleeve being formed with creases which delimit a plurality of wall portions and which render the sleeve capable of being folded flat and the base being dimensioned to fit snugly within the sleeve, a frame for supporting the base and defining a peripheral flange which is overlaid by a lower portion of the sleeve, means for releasably securing the frame and the sleeve together at said peripheral flange and said lower portion of the sleeve, the securing means comprising load spreading members shaped to engage the lower portions of the walls of the sleeve and the lower edge of the sleeve, and a set of ground engaging wheels mounted to depend from the frame.

* * * * *